United States Patent [19]

Kehr et al.

[11] 4,412,029

[45] Oct. 25, 1983

[54] ELASTOMERIC COMPOSITION FOR PROVIDING ELECTRICAL STRESS CONTROL

[75] Inventors: Dieter Kehr, Hamburg; Manfred Viebranz, Neu-Wulmstorf, both of Fed. Rep. of Germany

[73] Assignee: Minnesota Mining and Manufacturing Company, St. Paul, Minn.

[21] Appl. No.: 239,539

[22] Filed: Mar. 2, 1981

[51] Int. Cl.³ .................... C08L 83/04; C08L 23/16
[52] U.S. Cl. .................................. 524/441; 523/204; 523/219; 524/449; 524/574; 524/588
[58] Field of Search ............ 523/200, 204; 524/441, 524/449, 588, 574

[56] References Cited

U.S. PATENT DOCUMENTS 3,349,164 10/1967 Wyatt .................................. 174/73
3,655,565 4/1972 McDonald ......................... 524/449

*Primary Examiner*—Lewis T. Jacobs
*Attorney, Agent, or Firm*—Donald M. Sell; James A. Smith; Gerald F. Chernivec

[57] ABSTRACT

A permanently elastic dielectric composition comprising a resilient dielectric base material, an electrically polarizable component having low electrical conductivity to increase the relative dielectric constant of the composition, and a component displaying metal conductivity for maintenance of the relative dielectric constant at high power frequencies.

18 Claims, 10 Drawing Figures

ELASTOMERIC COMPOSITION FOR PROVIDING ELECTRICAL STRESS CONTROL

TECHNICAL FIELD

The invention relates to a dielectric material of permanent resilience, for influencing electrical fields in power current and high voltage systems, the material containing a dielectric base material having permanent resilience, preferably silicone rubber or polyethylene or EPDM, with a content of a finely distributed effect material increasing the relative dielectric constant (permittivity).

BACKGROUND ART

Description of the general prior art with respect to stress control can be found, for example, in the German Offenlegungsschrift No. 28 21 017.

Materials of the general kind indicated above are known, for example, from U.S. Pat. No. 4,053,702. They contain titanium dioxide as the effect material. That known substance makes possible, inter alia, the manufacture of permanently resilient stress control elements of definite geometric configuration, which may be simply shifted on, while yielding resiliently, at the site of application, typically a cable connection. Due to their resilience, they then fit in a gap-free manner. That strong and gap-free fitting is retained, due to the permanently resilient properties, over very long time periods, for instance many years, and particularly over the usual operational life of power/current systems. The application of such permanently resilient stress control elements requires less knowledge and skill than the application of other stress control devices, such as, for example, metallic stress control cones, the gap-free wrapping of tapes of stress-controlling material, the molding or modelling and subsequent hardening of flowable or shapeable masses having stress-controlling properties at the site of operation, etc.

Materials of the kind described initially therefore have made possible a considerable advance in the field of stress control in power current and high voltage systems.

The materials described initially act, together with cable insulating materials of low dielectric constant, upon electric fields in the sense of a refraction. For the sake of completeness, it should be mentioned that for the manufacture of stress-controlling devices, other materials are known which mainly act in a resistive manner; they contain electrically conductive or semi-conductive effect materials which provide to the material a desired (mostly voltage-dependent) electrical conductivity (U.S. Pat. Nos. 3,673,305; 3,666,876). In these cases, permittivity is also increased by the embedding of particles of electrically conductive or semi-conductive effect material; for example, it may be up to 11 (U.S. Pat. No. 3,666,876). With resilient materials having resistive stress control properties, however, the active current, which due to the function flows continuously, may gradually give rise to changes of electrical conductivity, and to a premature ageing of the material. Thus, other modes of operation are preferred for permanently resilient materials, particularly the refractive mode of operation which also applied to the material of the present invention.

It will be appreciated that a relatively high permittivity of the material is desirable. Thus, it is desired to use substances having a permittivity as high as possible as the effect material for materials showing refractive stress control action, e.g. the titanium dioxide already mentioned, but also other known substances of very high permittivity, e.g. barium titanate. The use of such materials as an effect material for materials having a refractive stress-controlling action has been known for a long time, but without paying particular attention to the requirement of permanent resilience (U.S. Pat. Nos. 3,673,305; 3,823,334; 3,287,489). In this connection, however, it was found also that when utilizing effect materials of very high permittivity, e.g. barium titanate having permittivities of approximately 10,000, the permittivity of the material cannot be increased beyond approximately 25 if the material is to retain the permanently resilient properties of the base material. The reason for this therefore is that in mixtures of that kind, the permittivity $\Sigma_{r\,mix}$ of the mixture has to be calculated according to a logarithmic, and not according to an additive, mixture formula from the permittivities $\Sigma_{rn}$ of the components of the mixture:

$$\log \Sigma_{r\,mix} = \sum_n X_n \log \Sigma_{rn}$$

in which $X_n$ is the volume ratio, and $\Sigma_{rn}$ is the relative dielectric constant (permittivity) of the component $\eta$. Accordingly, that formula shows particularly that with a material consisting of two components, namely, Component 1: Elastomeric base material having an $\Sigma_r$ of about 3,
Component 2: Barium titanate having an $\Sigma_r$ of about 10,000, one would have to employ a proportion of about 35 volume percent or about 75 weight percent barium titanate to obtain a permittivity of the mixture of about 50. With the proportion of effect material being so high, the resilient properties, however, of the material are insufficient to permit the manufacturing therefrom of practicable gap-free fitting stress control elements having permanent resilience. The resilience itself, as well as the maintenance in time of an elastic tension once produced in the material (the so-called permanent resetting force), are insufficient. It was generally true for the prior art (e.g., U.S. Pat. No. 4,053,702) that permanently resilient materials of the kind initially described could be manufactured with permittivities of only up to about 25, even when employing the known effect materials having very high permittivities. The permanent resiliency of dielectric materials can only be observed and maintained for the technical practice of testing results achieved if the residual stress (permanent set) under constant deflection according to the specification DIN No. 53517 (ISO-STANDARD R 815-69), particularly after accelerated ageing for 72 hours at 150° C. are always less than about 35% and results of SHORE-A Hardness according to the specification DIN No. 53505 (ISO-STANDARD R 868-68) are less than 65. If these requirements characterizing permanent resiliency cannot be met it cannot be warranted that such materials can be used to produce elastic stress control elements. All described materials known until now, which have a permittivity above 25 do not pass this important criteria of permanent resiliency.

DISCLOSURE OF INVENTION

The present invention provides a dielectric, permanently resilient material which is suitable for a highly effective refractive stress control.

According to the invention, there is provided a material of the kind initially described, wherein the effect material comprises strongly structurized dust-fine particles of an electrically polarizable material, such as carbon black, in a concentration at which in the range of usual power frequencies, e.g. 50 cycles per second, the following properties of the material are present in combination:

(a) The volume resistivity has at least a minimum value which is still sufficient for purposes of electrical insulation, (b) The relative dielectric constant (permittivity) is greater than 30, and up to about 300, and (c) The dielectric loss factor is not greater than approximately 1.5 and further comprises a supplemental effect material in the form of finely divided particles possessing metal conductivity to improve the electric stress dissipation and consequently the dielectric strengths at high frequencies as they are typical for impulse waves, and to hold the permittivity at high frequencies (e.g. $10^5$ Hz) to at least about 20.

DETAILED DESCRIPTION

The composition according to the invention utilizes the fact that with effect materials like carbon black, which comprise strongly structurized or cleft dust-fine polarizable particles, a relatively small range of mean concentrations in the base material can be found in which there is no disturbing electrical conductivity and a relatively high permittivity with satisfactory properties of permanent resilience. The material further comprises a supplemental effect material of metal conductivity which performs in such a way that the impulse resistance required for high voltage accessories is maintained. It is surprising that in this manner, permanently resilient insulating materials can be produced which are dielectrics, i.e. insulators, and which have substantially higher permittivities than hitherto possible, and which exhibit the necessary high electric impulse strength required for high voltage equipment.

True, it is known that the permittivity of an insulating material can be increased by the incorporation of finely divided particles of electrically conductive or semi-conductive material, as long as excessive concentrations of such particles are avoided because they can provide an excessive specific electrical conductivity which is not suitable for the use as an insulating material. However, it has been stated in respect thereto that by the addition of finely divided titanium dioxide or carbon black, the permittivity of natural or synthetic rubber could be increased to values from 10 to about 25, and that it would be appropriate to use titanium dioxide because that material had a less adverse effect upon the dielectric strength and the specific volume resistivity (U.S. Pat. No. 3,287,489). That statement is in correspondence with the known teaching stated in U.S. Pat. No. 4,053,702 that elastomeric materials of the kind indicated comprising titanium dioxide, titanates or the like as effective materials, can be produced with a permittivity of up to only about 25, and that, for example, a permittivity of at least 50 could not be reached with elastomeric materials.

Furthermore, stress-controlling materials are known which contain carbon black as a filler for improving the mechanical properties of the material (U.S. Pat. Nos. 3,515,798; 3,349,164), or as an effect material for obtaining a desired electrical conductivity (U.S. Pat. No. 3,673,305); however, no suggestions towards the present invention can be found in this connection.

The composition according to the invention in principle is very simple and can be produced at minimum expense. In combination, it shows good properties of permanent resilience, good chemical durability, good electrical insulating capability, fully satisfactory dielectric and impulse strength, and high values of permittivity which had not been thought possible hitherto with compositions displaying permanent resilience. Thus, the composition according to the invention can particularly be employed at great advantage in stress control elements which then can have substantially smaller dimensions as compared with elements made of known refractive materials of lower permittivity. Such a stress control element, e.g. in the form of a shaped body, like a sleeve, which can be shifted-on resiliently, is designed with respect to its electrical properties and its geometric configuration, in correspondence with the desired modification of an electric field existing at its site of application. Additionally, depending upon the strength of the electric field, a constituent of electrically conductive resilient material may be inserted in the stress control element to make contact with a cable shield.

The composition according to the invention preferably has a permittivity between about 50 and 150, at low frequencies (e.g., 50 Hz) and at least about 20 at high frequencies (e.g., $10^5$ Hz). In this range, the properties of permanent resilience are particularly good, at a good electrical insulating capability.

The effectiveness of the strongly structurized of cleft dust-fine polarizable particles employed in accordance with the invention is dependent upon the morphology of the particles. Therefore, the concentration of effect material to be employed in the production of the composition is determined by producing for every given charge of unitary quality of the effect material, a plurality of test compositions having different contents of effect material, determining the permittivity $\Sigma_r$ at low frequencies (e.g. 50 Hz) and the specific electrical volume resistivity $\rho$ for each of the test compositions, and determining the concentration of effect material at which a desired pair of values $\Sigma_r$, $\rho$ is present. It is particularly advantageous to determine a concentration as the optimum one which is associated in the function $\log \Sigma_r = f (\log \rho)$ with a medium range in which the absolute value of the slope is higher than in the area adjacent on both sides. In this manner, the suitable concentrations and particularly also the optimum concentrations in the base materials can be evaluated for every charge of an effect material exhibiting a macroscopically unitary quality.

It has been found that with the preferred effect material, i.e. carbon black, the commercially available qualities show very different effectiveness in the sense of the present invention. For example, the optimum concentration may be approximately 3 parts by weight, but also approximately 30 parts by weight per 100 parts by weight base material. Thus, the teaching to determine the concentrations to be used separately for every charge of an effect material exhibiting a macroscopically unitary quality constitutes an essential part of the present invention.

The minimum value of the specific electrical volume resistivity of the composition according to the invention should be approximately $10^6$ ohm.cm in order for the composition to still be considered an insulating material; preferably, the minimum value is approximately $10^8$ ohm.cm. Furthermore, the composition according to the invention is characterized in that it has, as a rule, a positive temperature coefficient of specific electrical volume resistivity. In other words, the temperature coefficient of the specific electrical volume resistivity should be at least approximately zero in the temperature range of from about 0° to 100° C. This offers the known advantage that the proportion of losses caused by action currents becomes smaller with an increasing temperature of the composition; this counteracts undesirable heating up. Preferably, the temperature coefficient of the specific electrical volume resistivity is approximately 0.01 per degree within the temperature range of about 0° to 100° C.

Within the range of permittivities stated, the dielectric loss factor at low and high frequencies is not greater than about 1.5, and not greater than about 1 in the range of the permittivities preferably employed. This is completely sufficient for the intended use as stress control elements for high voltage accessories.

Furthermore, it has been found that the addition of a conductive material showing metal conductivity, as known per se from the German Offenlegungschrift No. 28 21 017, in the form of finely divided particles, the load carrying capability and the stress control action are strongly improved at high frequencies, e.g., as may occur with loads produced by shock waves or lightening strikes in high voltage lines. Experiments with impulse voltage loads of a duration of 1.2 per 50 μs have shown that the stability against such impulses can be increased by up to 100 percent by the additional use of platelet-shaped conductive material. The conductive material may consist simply of aluminum which is easily and commercially available in form of thin platelets or flakes. The conductive material may also consist of vacuum metalized microspheres based on glass spheroids or plastic spheroids. In the latter case, it is generally sufficient if the microspheres are only superficially conductive. The area size of the conductive microspheres should be in the same range as the area of conductive platelets, which means that the conductive surface of both types of particles will be comparable.

In order to increase the dielectric strength of the composition according to the invention, it may be advantageous to additionally intermix, as an additional effect material, an insulating material which is different from the base material, in finely divided form as platelet-shaped particles (See German OLS No. 2821017). Thereby, the concentration of bridges between directly contacting particles of the effect material and of the additional conductive effect material is strongly reduced. Preferably, the insulating material has a higher dielectric strength than the base material to thereby increase dielectric strength of the composition. In order to not adversely affect, and possibly increase the refractive action of the composition, it is advantageous to use an insulating material having a permittivity which is at least equal to that of the base material. An insulating material which is particularly suited as an additional effect material is mica which inherently is of platelet structure. Also, when employing an insulating material different from the base material, the boundary conditions stated above are maintained.

The size of the platelets of the additional effect material is of importance for dielectric homogeneity of the composition in relation to the dimensions of the structural parts made therefrom. With the dimensions and flash-over distances which are appropriate for alternating voltages from about 3 kV, the platelets of the conductive material may have a transverse dimension, measured transverse of their thickness, of about 5 to 75 μm; an advantageous intermediate range is 10 to 40 μm. The thickness of the platelet-shaped particles should be not more than about one tenth of the transverse dimension to retain the character of a platelet. Of course, the same also holds for the platelets of insulating material, and they may be somewhat larger than platelets of conductive material, particularly with respect to their transverse dimensions.

It is particularly advantageous that, as known from German Offenlegungsschrift 28 21 017, the platelets of conductive material need not be oriented in definite directions but, rather, may be distributed with an essentially random-distribution orientation of their platelet planes. Thus, particular manufacturing steps to orient the platelets, e.g., calendering, pasting-on, and the like, are not necessary when compositions containing platelet-shaped particles according to the invention are produced.

The dielectric composition according to the invention can be prepared by inter-mixing the effect material, the conductive effect material and, where desired, the additional insulating effect materials with a liquid or paste of flowable or die-castable base compound which is capable of being hardened to the permanently resilient composition, for example by cold or hot vulcanizing. The hardening can be performed in molds, whereby permanently resilient bodies of a desired shaped configuration can be directly obtained which are suitable as stress control elements. Injection molding, casting, die casting, etc., are also satisfactory manufacturing techniques.

With particular kinds of carbon black which are particularly suited for the purposes of the present invention, i.e. which even at low concentrations cause a strong increase in permittivity, it has been found to be appropriate to introduce the carbon black in a phase of the preparation process where the viscosity is as low as possible. Then, the dispersion of the carbon black is more uniform.

The invention will now be more specifically illustrated by the following examples, wherein all parts are by weight unless otherwise specified, and which are discussed in conjunction with the attached drawings.

EXAMPLES

One hundred parts by weight of silicone rubber base material of the type S 2351 of Dow Corning were intermixed with different parts by weight carbon black (N 754 of Columbian Carbon Company, New York) and various parts by weight aluminum platelets (No. 4-501 of Reynolds Metal Company, Richmond, Va., U.S.A.).

In each case, the mixtures were intermixed with 0.4 parts by weight of the catalyst dicumylperoxide (of the type "Dicup R" of Herkules), and cured in molds to form permanently resilient test bodies of about 3 mm thickness.

Figure 1:
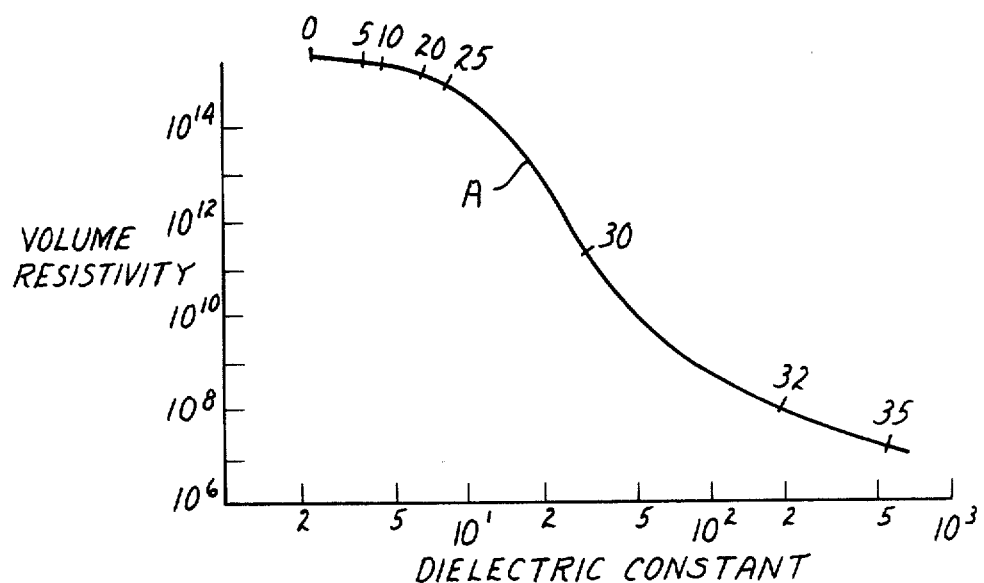
FIGS. 1 to 5 illustrate the properties of dielectric compositions which have been prepared with the effect material carbon black, type N 754, as set forth below.

FIG. 1 illustrates the relationship between the logarithms of the relative dielectric constant (permittivity) and the electrical volume resistivity for different proportions of carbon black. It is apparent that in the medium range of curve A, i.e., with the proportion of carbon black where the absolute value of the slope is higher than in the adjacent ranges (i.e. the first derivative has an extremum), relatively high permittivities are evident at still very high volume resistivities, for instance $\Sigma_r = 50$ at $\rho = 10^{10} \Omega$ cm. Only from $\Sigma_r = 200$ does the volume resistivity commence to drop to values which are critical with respect for use as an insulating material; the readily useful range extends to about $\Sigma_r = 150$.

Figure 2:
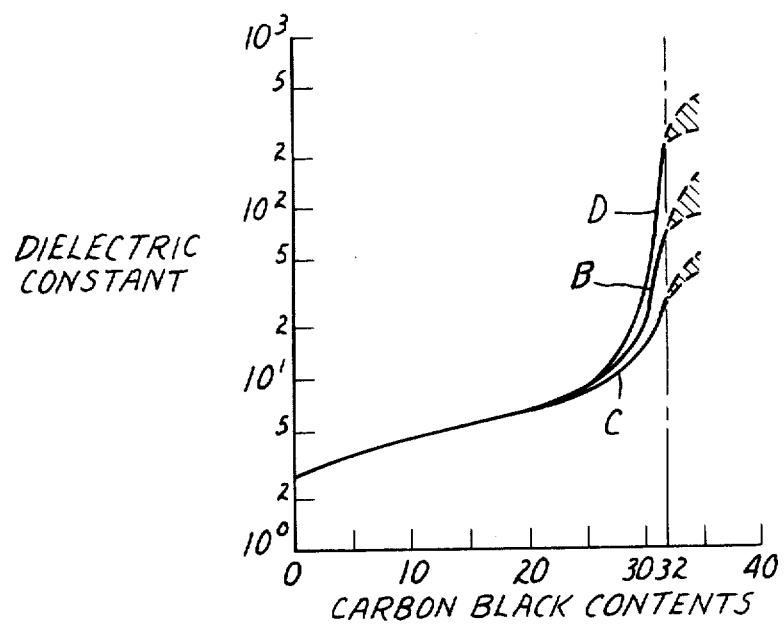

FIG. 2 illustrates that at higher frequencies, permittivity decreases relatively rapidly. Curve B designates 1.0 kHz, Curve C 24 kHz and Curve D 53 Hz.

Figure 3:
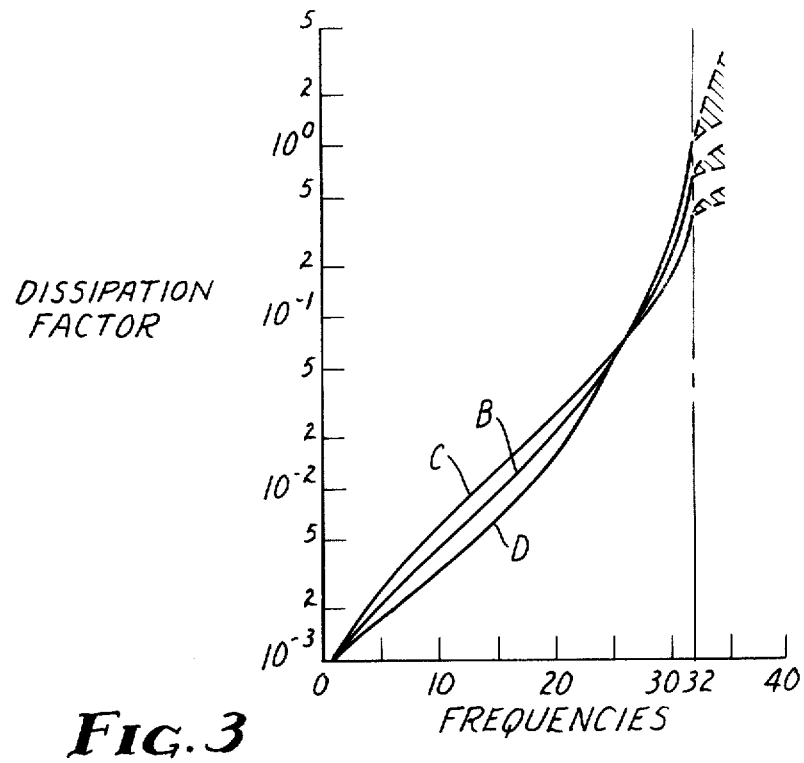

FIG. 3 illustrates that, as expected, the dielectric loss factor increases with increasing proportions of carbon black; in contrast thereto, the dependence upon frequency is less distinct. Curves B, C and D relate to the same frequencies as FIG. 2.

Figure 4:
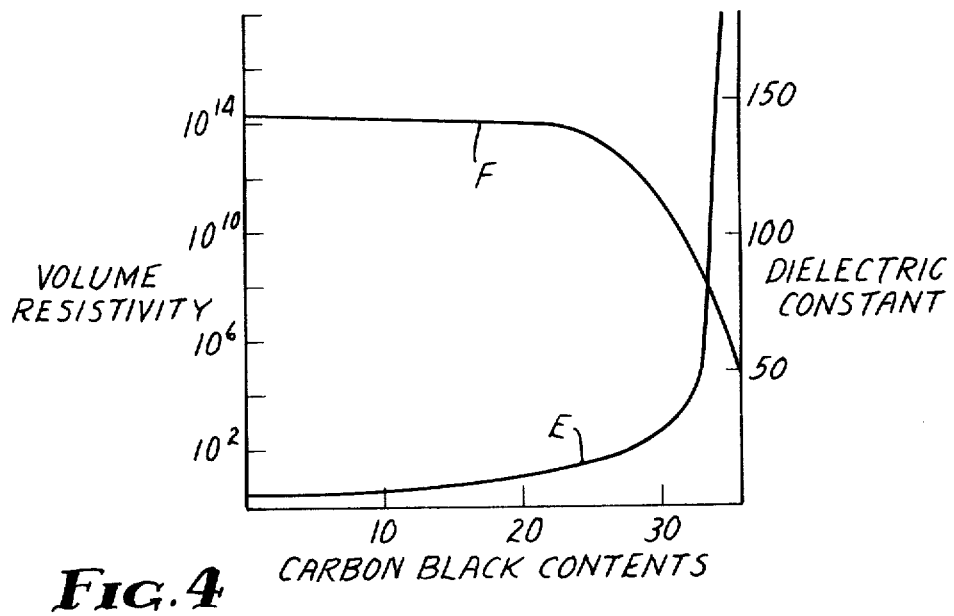

FIG. 4 illustrates—similarly as FIG. 1—the relation between the relative dielectric constant (permittivity) $\Sigma_r$ (at 50 cps) (Curve E) and the dielectric volume resistivity $\rho$ (Curve F) when the proportions of the effect material carbon black (type N 754) are increasing. In this instance 10 parts of Type 4-501 aluminum flake were also contained in the elastomer.

Figure 5:
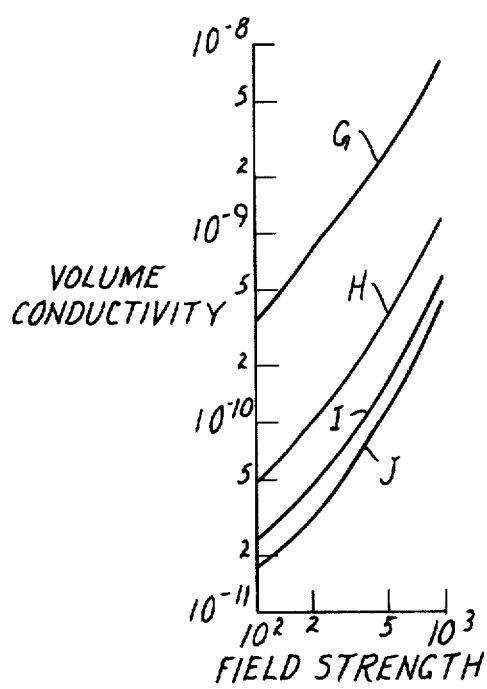

FIG. 5 illustrates the dependence of specific direct current conductivity (the reciprocal of the volume resistivity) upon the field strength at various temperatures for a test body having 32 phr carbon black of the type N 754. Curve G relates to 20° C., Curve H 50° C., Curve I 80° C. and Curve J 100° C.

Figure 6:
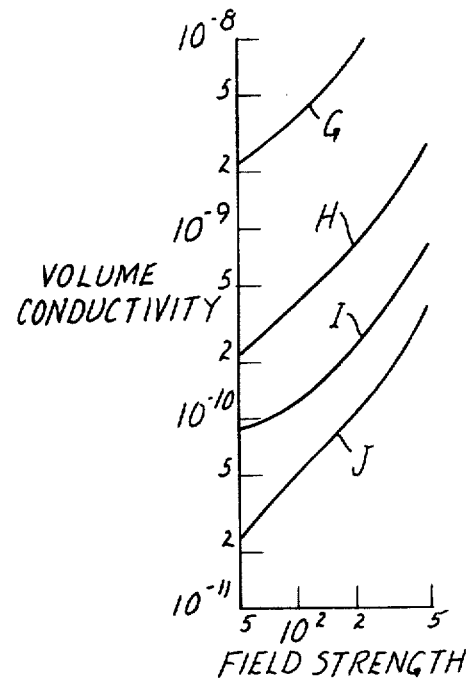
FIGS. 6 to 9 illustrate the properties of dielectric compositions according to the invention, which contain an additional effect material in the form of conductive platelets.

FIG. 6 illustrates for a dielectric composition having 32 phr carbon black of the type N 754 and 10 phr aluminum platelets for the type 4-501 (REYNOLDS), that the direct current resistivity is not increased by the introduction of the conductive effect material; a similar dependence to that shown in FIG. 5 exists. Curves G, H, I and J relate to the same temperatures as FIG. 5. Both figures, moreover, illustrate the positive temperature coefficient of volume resistivity.

Figure 7:
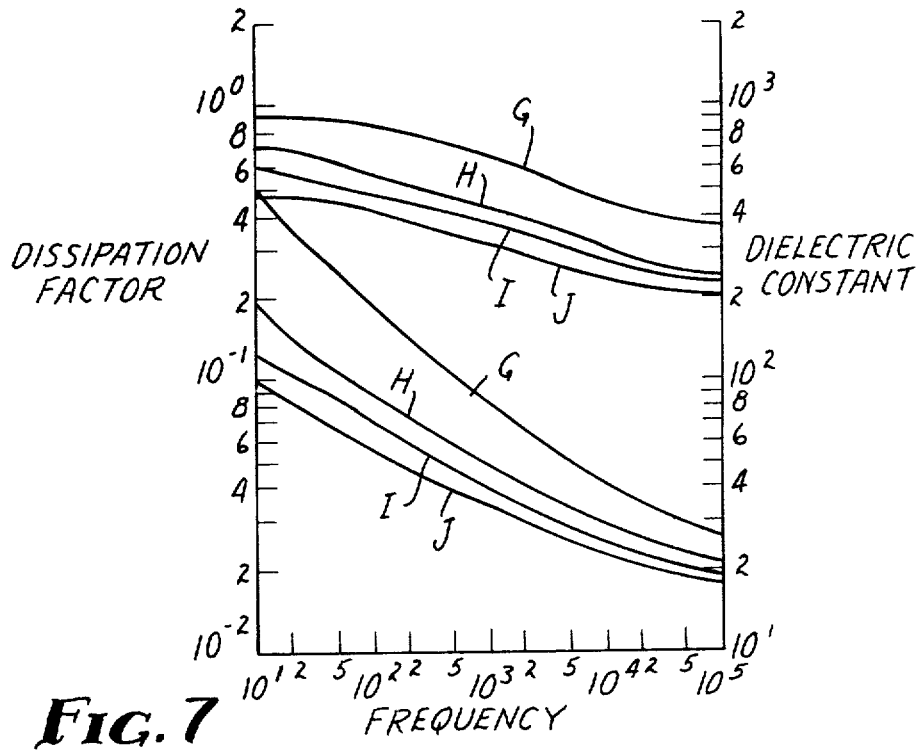

FIG. 7 illustrates the dielectric loss factor tan $\rho$ and the dielectric constant (permittivity) $\Sigma_r$ dependence upon the frequency f at various temperatures (same as FIG. 5) for dielectric materials having 32 phr carbon black of the type N 754 and 10 phr aluminum platelets of the type 4-501. It can be recognized that it is easily possible to adjust the dielectric loss factor close to values at least about 1 at low frequencies as well as at high frequencies and that the permittivity at room, and even elevated temperature, is characterized by values between 50 up to 100 at low frequencies (e.g., 50 Hz) and to values at least about 20 at high frequencies (e.g., $10^5$ Hz).

Figure 8:
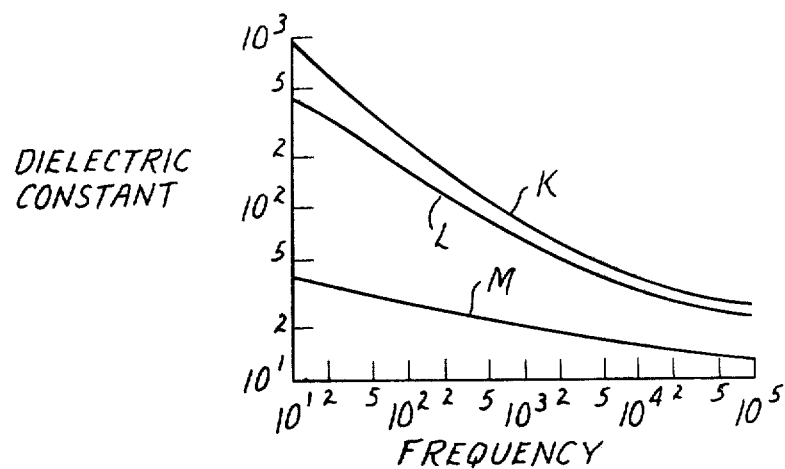

FIG. 8 illustrates that a dielectric material containing 32 phr carbon black (type N 754) provides, due to the addition of 10 phr aluminum platelets an essential increase of the relative dielectric constant (permittivity) at low frequencies (e.g., 50 Hz) from about 250 up to 400 maximum, whereas at high frequencies (e.g., $10^5$ Hz) the relative dielectric constant is held at about 25. Curve K represents 32 phr carbon black, and 10 phr aluminum, Curve L with no aluminum, and Curve M with no aluminum and 30 phr carbon black.

Figure 9:
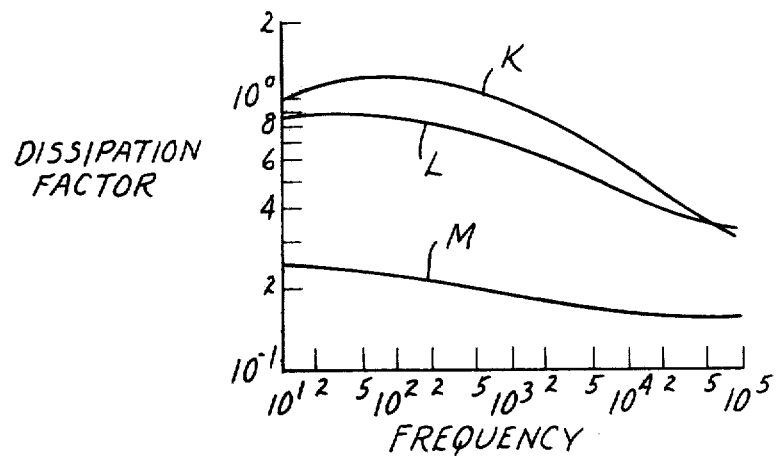

FIG. 9 illustrates that this increase in relative dielectric constant is only associated with a minor increase in dielectric loss factor.

Figure 10:
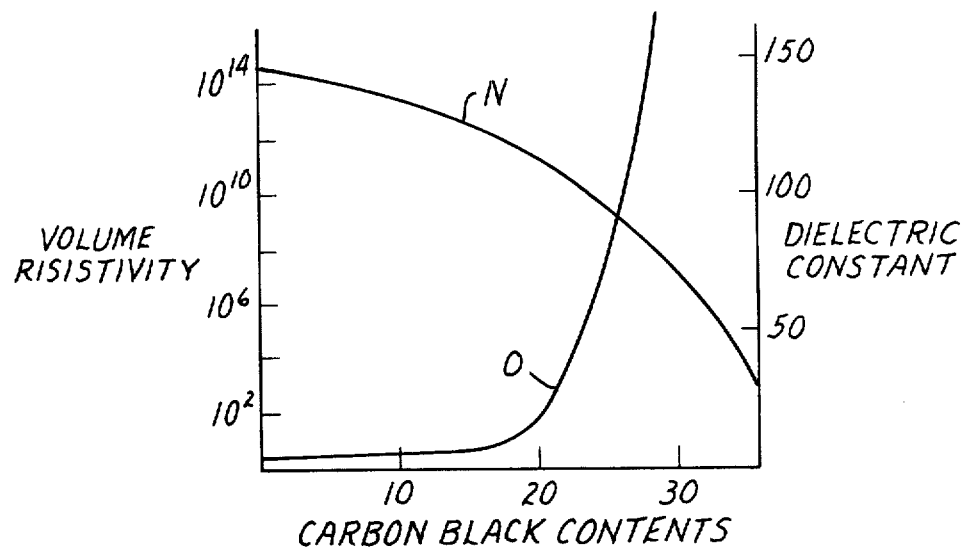
FIG. 10 illustrates compositions according to the invention, prepared with silicone rubber type 101/30 and as the effect material carbon black, type N 762, as set forth below.

FIG. 10 illustrates, in a manner similar to FIG. 4, the properties of a dielectric material made with other components. As a base material, silicone rubber type 101/30 of the firm Wacker-Chemie, Munchen, was used; as an effect material carbon black of the brand N 762 of Columbian Carbon Company; and as an additional effect material, the already described aluminum platelets. One hundred parts by weight of the base materials were intermixed with 6 parts by weight of the aluminum platelets, different amounts of the carbon black, and 1.5 parts by weight of the above mentioned catalyst dicumyl peroxide "Dicup 40C", filled into molds, and cured. It is apparent from FIG. 10 that basically the same characteristics are obtained as illustrated in FIGS. 1 to 9. However, the first derivative of the function log $\rho = f$ (log $\Sigma_r$) reaches its extremum at a different, i.e., lower, carbon black concentration than shown in FIG. 4.

According to present understanding, it appears to be predominantly important for the described invention that the particles of effect material have a surface area which is large in relation to their mass, and capable of offering a certain resistance to the displacement of electrical charges. It may be imagined that other effective materials, which have properties similar to carbon black, may produce similar or perhaps even better results than carbon black, and the present invention provides a teaching to the skilled expert how to test substances which may be suitable as effect materials. In cases where respective material data for the effect materials are known which characterize the structure and performance of its particles, and where these data are useful also to characterize the effectiveness of the present invention in accordance with the rating criteria described in this specification, it may be sufficient to simply apply such data for repeat orders for commercially available brands of suitable effect materials. In the above examples, the carbon black brands are characterized by ASTM designations according to U.S. standards, under which they are also commercially available.

We claim:

1. A permanently elastic dielectric composition for influencing electrical fields in power current and high voltage systems, comprising a permanently resilient dielectric base material, a finely divided effect material to increase the relative dielectric constant, comprising strongly structurized dust-fine particles of an electrically polarizable material of low electrical conductivity, in sufficient concentration, but less than about 3 O parts per hundred parts of said base material, to provide, within the range composition in combination:

(a) An electric volume resistivity of at least about $10^6$ ohn cm at room temperature,
   (b) A relative dielectric constant between about 30 to about 300,
   (c) A dielectric loss factor of less than about 1.5, and a content of a supplemental effect material comprising finely divided particles possessing metal conductivity, in sufficient concentration to maintain the relative dielectric constant at not less than about 20 at high power frequencies.

2. The composition of claim 1, wherein said effect material is carbon black.

3. The composition of claim 1, wherein said electric volume resistivity has a temperature coefficient in the temperature range of about 0° to 100° C. of about zero.

4. The composition of claim 1, wherein said relative dielectric constant is between 50 and 150 at low power frequencies.

5. The composition of claim 1 wherein said dielectric loss factor is about 1 at low and high frequencies at room temperature.

6. The composition of claim 1, wherein said supplemental effect material consists of finely divided microspheres.

7. The composition of claim 6, wherein said microspheres are only superficially conductive.

8. The composition of claim 6, wherein said microspheres have a diameter of at least about 2 μm.

9. The composition of claim 1, wherein said supplemental effect metal consists of finely divided platelets.

10. The composition of claim 1, wherein said supplemental effect material is aluminum.

11. The composition of claim 10, wherein said aluminum is present at a concentration of about 3 to 15 parts by weight per 100 parts by weight of said base material.

12. The composition of claim 1, additionally comprising an insulating material different from said base material in finely divided form as platelet-shaped particles.

13. The composition of claim 12, wherein said insulating material has a dielectric strength not less than said base material.

14. The composition of claim 12, wherein said insulating material is mica.

15. The composition of claim 14, wherein said mica is present at a concentration of about 5 to 30 parts by weight per 100 parts by weight of said base material.

16. The composition of claim 1, in the form of a shaped body capable of functioning as a refractive stress control element.

17. The composition of claim 16, wherein said body is a sleeve capable of resiliently sliding on a cable termination.

18. The composition of claim 1, wherein said base material is selected from the group consisting of silicone rubber and EPDM.

* * * * *